United States Patent

Sugiyama et al.

(10) Patent No.: US 6,658,317 B2
(45) Date of Patent: Dec. 2, 2003

(54) METHOD FOR SETTING A MOVING POSITION IN A MACHINE TOOL

(75) Inventors: Tetsuya Sugiyama, Shizuoka (JP); Takehisa Kajiyama, Shizuoka (JP); Yoshihiro Sei, Shizuoka (JP); Masanori Hasegawa, Shizuoka (JP)

(73) Assignee: Star Micronics Co., Ltd., Shizuoka (JP)

( * ) Notice: Subject to any disclaimer, the term of this patent is extended or adjusted under 35 U.S.C. 154(b) by 0 days.

(21) Appl. No.: 10/167,474

(22) Filed: Jun. 13, 2002

(65) Prior Publication Data

US 2002/0193906 A1 Dec. 19, 2002

(30) Foreign Application Priority Data

Jun. 14, 2001 (JP) .................................... P. 2001-180567

(51) Int. Cl.[7] .............................................. G06F 19/00
(52) U.S. Cl. ...................... 700/187; 82/100; 700/163; 704/270
(58) Field of Search ..................... 704/270; 700/187, 700/163; 451/5; 82/100; 83/76.8

(56) References Cited

U.S. PATENT DOCUMENTS 3,763,363 A * 10/1973 Saita et al. ................. 708/270
4,375,670 A * 3/1983 Kralowetz et al. ............ 82/100
5,810,520 A * 9/1998 Hintze et al. ................ 407/116
6,044,309 A * 3/2000 Honda ......................... 700/187
6,520,228 B1 * 2/2003 Kennedy et al. .............. 83/76.8

FOREIGN PATENT DOCUMENTS

| EP | 1 122 624 A2 | 8/2001 |
| EP | 1 163 978 A1 | 12/2001 |
| JP | 3-296109 | 12/1991 |

* cited by examiner

*Primary Examiner*—Albert W. Paladini
(74) *Attorney, Agent, or Firm*—Rosenthal & Osha L.L.P.

(57) ABSTRACT

A contour shape of a desired shape of a workpiece at section along a predetermined axis is divided into machining units. Each of the machining units includes a plurality of inflection points including a machining start point and a machining end point. Machining data at least necessary for performing machining is set for each of the machining units. Arrival times at the inflection points are calculated based on the machining data, and a position of at least one of the workpiece and the tool is calculated for each of the inflection points. For each of the machining units, a rotation angle position of the workpiece corresponding to the arrival time is set as an accumulated count value.

9 Claims, 14 Drawing Sheets

| ACCUMULATED COUNT VALUE (N) | MOVING POSITION (Zp) OF WORKPIECE | MOVING POSITION (Xp) OF TOOL | DESIGNATED TOOL |
|---|---|---|---|
| ⋮ | ⋮ | ⋮ | ⋮ |
| 2,000 | 1 | 2 | FIRST TOOL |
| 3,500 | 3 | 2 | FIRST TOOL |
| 6,000 | 7 | 4 | FIRST TOOL |
| 7,000 | 8 | 4 | SECOND TOOL |
| 8,000 | 8 | 3 | SECOND TOOL |
| 9,000 | 9 | 3 | SECOND TOOL |
| 10,000 | 9 | 4 | SECOND TOOL |
| 12,000 | 11 | 2 | THIRD TOOL |
| 13,000 | 10 | 2 | THIRD TOOL |
| 14,000 | 10 | 4 | THIRD TOOL |
| ⋮ | ⋮ | ⋮ | ⋮ |

| ACCUMULATED COUNT VALUE (N) | MOVING POSITION (Zp) OF WORKPIECE | MOVING POSITION (Xp) OF TOOL | DESIGNATED TOOL |
|---|---|---|---|
| ⋮ | ⋮ | ⋮ | ⋮ |
| 1,625 | 0.5 | 2 | FIRST TOOL |
| 3,500 | 3 | 2 | FIRST TOOL |
| 6,125 | 7.2 | 4.1 | FIRST TOOL |
| 7,000 | 8 | 4 | SECOND TOOL |

METHOD FOR SETTING A MOVING POSITION IN A MACHINE TOOL

BACKGROUND OF THE INVENTION

1. Field of the Invention

This invention relates to a method for setting a moving position of at least one of a workpiece and a tool in a machine tool to machine the workpiece into a desired shape by moving at least one of the workpiece and the tool with the workpiece rotated around a predetermined axis.

2. Background Art

An apparatus for controlling the moving position of at least one of a workpiece and a tool is disclosed in Japanese Patent Laid-Open No. 296109/1991. The driving control apparatus for a machine tool disclosed in Japanese Patent Laid-Open No. 296109/1991 is arranged so as to electronically perform the driving control of the machine tool which was mechanically performed by cams in the conventional art. The driving control apparatus disclosed in the publication includes a pulse encoder attached to a rotatable member, a rotation position storage means which reads a pulse signal from the pulse encoder and stores ever-changing rotation position data, and a command position storage means which stores command position data representing a moving position on a moving axis set for every unit rotational position of the rotatable member. Ever-changing moving command data on the moving axis is generated from the rotation position data and the command position data. Further, command speed data of the moving axis in synchronous with the rotation speed of the rotatable member is generated from the moving command data and the rotation position data. Then, the position of the tool is controlled by the moving command data and the command speed data thus generated.

However, in the driving control apparatus as disclosed in Japanese Patent Laid-Open No. 296109/1991, it is required to store, in a memory such as a RAM etc. as the command position storage means, the command position data (moving positions) on the moving axis set for every unit rotation position of the rotatable member, that is, enormous position data relating to a desired machining shape. Thus, the storage capacity of the memory becomes too large. Further, in order to improve the machining accuracy of the workpiece, it is required to finely set the unit rotation positions to further increase the number of the position data, which results in the large increase of the storage capacity.

SUMMARY OF THE INVENTION

Accordingly, the invention has been made in view of the aforesaid problems of the conventional technique, and an object of the invention is to provide a method for setting a moving position in a machine tool, which can improve the machining accuracy of a workpiece by a tool without increasing a storage capacity for position data.

According to the invention, a method for setting a moving position of at least one of a workpiece and a tool in a machine tool for machining the workpiece rotated around a predetermined axis into a desired shape by the tool, comprises the steps of:

dividing a contour shape of the desired shape at section along the predetermined axis into a plurality of machining units, each including a plurality of inflection points including a machining unit start point and a machining unit end point;

setting machining data including at least machining speed data for each of the machining units;

calculating an arrival time to each of the inflection points based on the machining speed data;

calculating a position of at least one of the workpiece and the tool at each of the inflection points; and setting a rotation angle position of the workpiece corresponding to the arrival time as an accumulated count value for each of the machining units.

In this manner, the contour shape of the workpiece is divided into a plurality of the machining units based on the contour shape of the finished workpiece, and the moving position of at least one of the workpiece and the tool is determined for each of the machining units. Thus, the position of at least one of the workpiece and the tool thus set is suitable for the actual machining operation and so the position data etc. can be set easily without error. In particular, since the contour shape is divided into the machining units by the inflection points of the contour shape, the positions can be inputted accurately by a small amount of the position data.

Further, since the moving positions of at least one of the workpiece and the tool for each of the machining units are set for the accumulation value of the rotation angle position of the workpiece, the position data at the both ends of the machining unit does not change at the time of the calculation due to re-division, insertion or addition of the machining unit. Any error to be accumulated by such calculation does not influence on the position data of other machining units. Further, at the time of the actual machining, since a moving command for controlling the movements of the workpiece and the tools is outputted based on the moving positions (position data) thus calculated, there does not occur cumulative error to the dimensions of the machined workpiece. As a result, accurate machining by the machine tool can be realized.

The method for setting positions according to the invention may further comprise the step of adding a cutting stock to the machining unit to obtain a new machining start point and a new machining end point.

The machining unit start point or the machining unit end point is extended with the addition of a cutting stock to obtain a new machining unit start point or a new machining unit end point. The cutting stock is an area which is finally cut off or an area in which the tool is moved as if the machining is performed. With the addition of a cutting stock to an actual machining area, the movement of the workpiece is made continuous under the same machining condition around the machining start portion and the machining end portion. Thus, the machining is stably performed with good accuracy. Further, the setting of such a cutting stock can be performed easily.

The method for setting positions according to the invention may further comprise the step of storing the position of one of the workpiece and the tool corresponding to the rotation angle position of the workpiece.

When configured in this manner, the calculated position of at least one of the workpiece and the tool is stored as the position data in correspondence with the rotation angle position of the workpiece. Thus, the positions can be suitably stored as the position data.

DETAILED DESCRIPTION OF THE PREFERRED EMBODIMENTS

The preferred embodiment of this invention will be explained with reference to the accompanying drawings.

Figure 1:
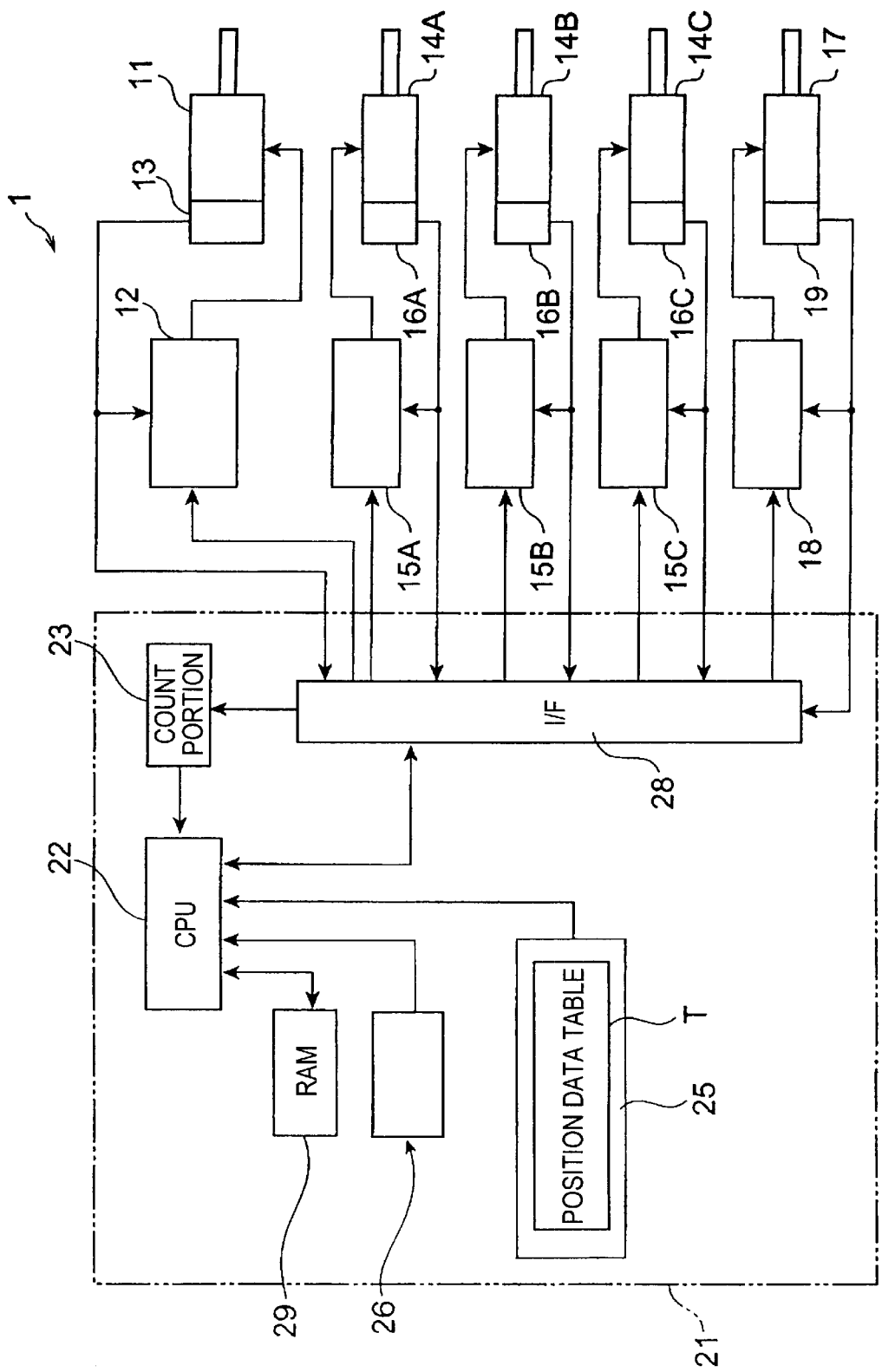
FIG. 1 is a block diagram showing a driving control apparatus for a machine tool according to the embodiment of the invention.

First, the configuration of the driving control apparatus for a machine tool according to the embodiment of the invention will be explained with reference to FIG. 1. FIG. 1 is a block diagram showing the driving control apparatus for the machine tool according to the embodiment. In FIG. 1, a machine tool 1 includes a spindle rotation motor 11, tool moving motors 14A, 14B, 14C, a workpiece moving motor 17, and a control unit portion 21 for controlling the driving operations of the respective motors 11, 14A, 14B, 14C, 17.

The spindle rotation motor 11 is provided in order to rotate and drive a spindle (not shown) configured so as to be able to hold the workpiece and is coupled to the control unit portion 21 through a spindle rotation motor driving portion 12. The spindle rotation motor 11 is provided with a pulse encoder 13 for detecting the rotation of the spindle rotation motor 11. The output of the pulse encoder 13 is coupled to the control unit portion 21 and the spindle rotation motor driving portion 12, and the rotation detection signal of the pulse encoder 13 is inputted into the control unit portion 21 and the spindle rotation motor driving portion 12. The pulse encoder 13 generates the rotation detection signal as a reference timing signal each time the spindle rotation motor 11 (the spindle) rotates by a predetermined angle and outputs the signal to the control unit portion 21 and the spindle rotation motor driving portion 12. The rotation center axis of the spindle rotation motor 11 (the spindle) constitutes the predetermined axis of the respective claims. The spindle rotation motor driving portion 12 is configured to control the electric power supplied to the spindle rotation motor 11 based on a spindle rotation speed command signal outputted from the control unit portion 21 described later and also to perform the feedback control of the electric power supplied to the spindle rotation motor 11 in response to the rotation detection signal of the pulse encoder 13 inputted therein.

The tool moving motors 14A, 14B, 14C are provided in order to move tools for machining the workpiece, for example, in a direction (X-axis direction) perpendicular to the rotation center axis of the spindle rotation motor 11 (the spindle) and are coupled to the control unit portion 21 through the corresponding tool moving motor driving portions 15A, 15B, 15C, respectively. The tool moving motors 14A, 14B, 14C are provided with pulse encoders 16A, 16B, 16C for detecting the rotation of the tool moving motors 14A, 14B, 14C, respectively. The outputs of the pulse encoders 16A, 16B, 16C are coupled to the control unit portion 21 and the tool moving motor driving portions 15A, 15B, 15C, whereby the rotation detection signals of the pulse encoders 16A, 16B, 16C are inputted into the control unit portion 21 and the tool moving motor driving portions 15A, 15B, 15C, respectively. The pulse encoders 16A, 16B, 16C generate the rotation detection signals each time the tool moving motors 14A, 14B, 14C rotate by a predetermined rotation angle and output the signals to the control unit portion 21 and the tool moving motor driving portions 15A, 15B, 15C, respectively. The tool moving motor driving portions 15A, 15B, 15C are configured to control the electric power supplied to the tool moving motors 14A, 14B, 14C based on tool position command signals outputted from the control unit portion 21 described later and also to perform the feedback control of the electric power supplied to the tool moving motors 14A, 14B, 14C in response to the rotation detection signals of the pulse encoders 16A, 16B, 16C inputted therein, respectively.

The workpiece moving motor 17 is provided in order to move the workpiece, for example, in a direction (Z-axis direction) in parallel to the rotation center axis of the spindle rotation motor 11 (the spindle) and is coupled to the control unit portion 21 through a workpiece moving motor driving portion 18. The workpiece moving motor 17 is provided with a pulse encoder 19 for detecting the rotation of the workpiece moving motor 17. The output of the pulse encoder 19 is coupled to the control unit portion 21 and the workpiece moving motor driving portion 18, whereby the rotation detection signal of the pulse encoder 19 is inputted into the control unit portion 21 and the workpiece moving motor driving portion 18. The pulse encoder 19 generates the rotation detection signal each time the workpiece moving motor 17 rotates by a predetermined rotation angle and outputs the signal to the control unit portion 21 and the workpiece moving motor driving portion 18. The workpiece moving motor driving portion 18 is configured to control the electric power supplied to the workpiece moving motor 17 based on the workpiece position command signal outputted from the control unit portion 21 described later and also to perform the feedback control of the electric power supplied to the workpiece moving motor 17 in response to the rotation detection signal of the pulse encoder 19 inputted therein.

Figure 2:
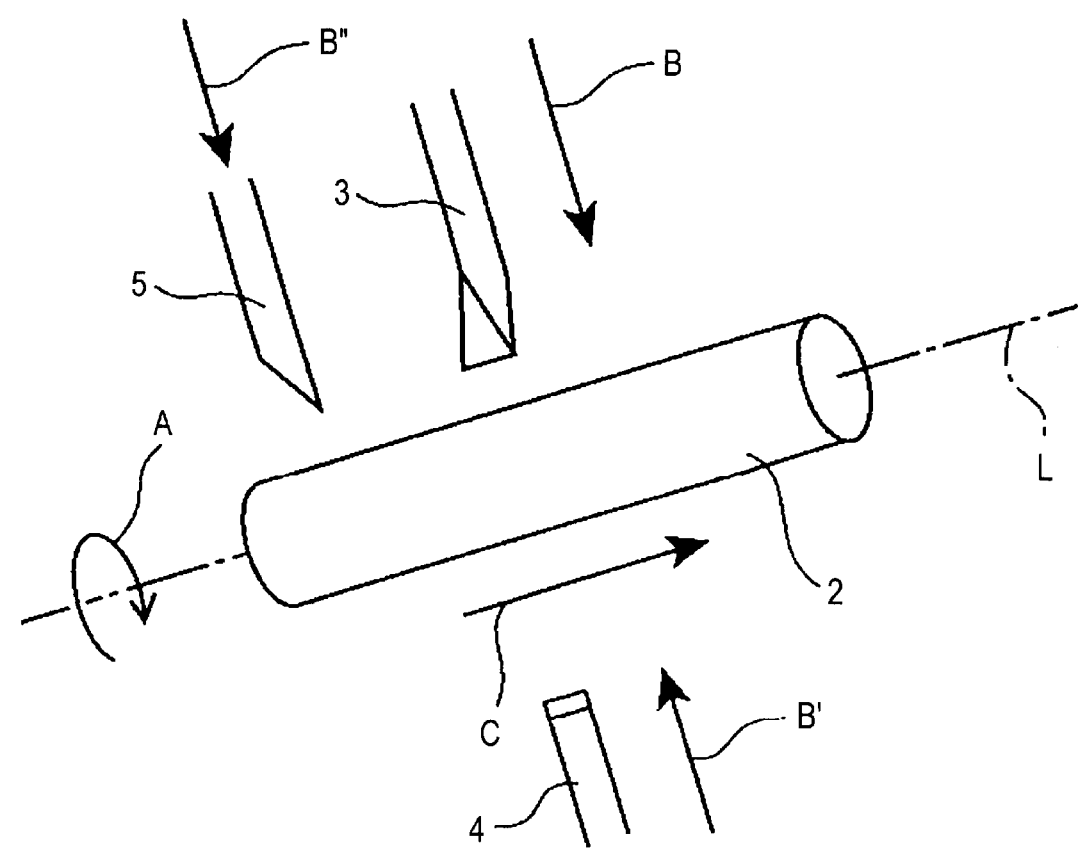
FIG. 2 is a diagram for explaining an example of the machining operation on a workpiece by the driving control apparatus for the machine tool according to the embodiment of the invention.

FIG. 2 is a diagram for explaining an example of the machining operation (cutting) of the workpiece 2 in the machine tool 1. As shown in FIG. 2, the workpiece 2 of a bar shape rotates around the rotation center axis L (in a direction shown by an arrow A in FIG. 2) of the spindle rotation motor 11 (the spindle) by the spindle rotation motor 11 and moves in a direction (a direction shown by an arrow C in FIG. 2) in parallel to the rotation center axis L of the spindle rotation motor 11 by the workpiece moving motor 17. A first tool 3 moves in a direction (a direction shown by an arrow B in FIG. 2) perpendicular to the rotation center axis L of the spindle rotation motor 11 by the tool moving motor 14A thereby to machine the workpiece 2 into a desired shape. A second tool 4 moves in a direction (a direction shown by an arrow B' in FIG. 2) perpendicular to the rotation center axis L of the spindle rotation motor 11 by the tool moving motor 14B thereby to machine the workpiece 2 into a desired shape. A third tool 5 moves in a direction (a direction shown by an arrow B" in FIG. 2) perpendicular to the rotation center axis L of the spindle rotation motor 11 by the tool moving motor 14C thereby to machine the workpiece 2 into a desired shape. A so-called Swiss-type machine tool performs the machining operation as shown in FIG. 2. In FIG. 2, the directions shown by the arrows B, B', B" are the aforesaid X axis direction and the direction shown by the arrow C is the aforesaid Z axis direction. The machine tool 1 is provided with the second and third tools 4, 5 which are disposed at standby positions so as to avoid interference.

As shown in FIG. 1, the control unit portion 21 includes a CPU 22, a count portion 23, a position data storage portion 25, a ROM 26, an interface portion 28 and a RAM 29 etc. The CPU 22 is a calculation portion for performing the entire signal processing of the control unit portion 21. The count portion 23 is coupled to the interface portion 28 and is configured in a manner that the rotation detection signal outputted from the pulse encoder 13 is inputted therein through the interface portion 28 thereby to count the number of the generated rotation detection signals thus inputted. The count portion 23 is also coupled to the CPU 22 and is configured in a manner that the counted result is outputted to the CPU 22.

Figure 3:
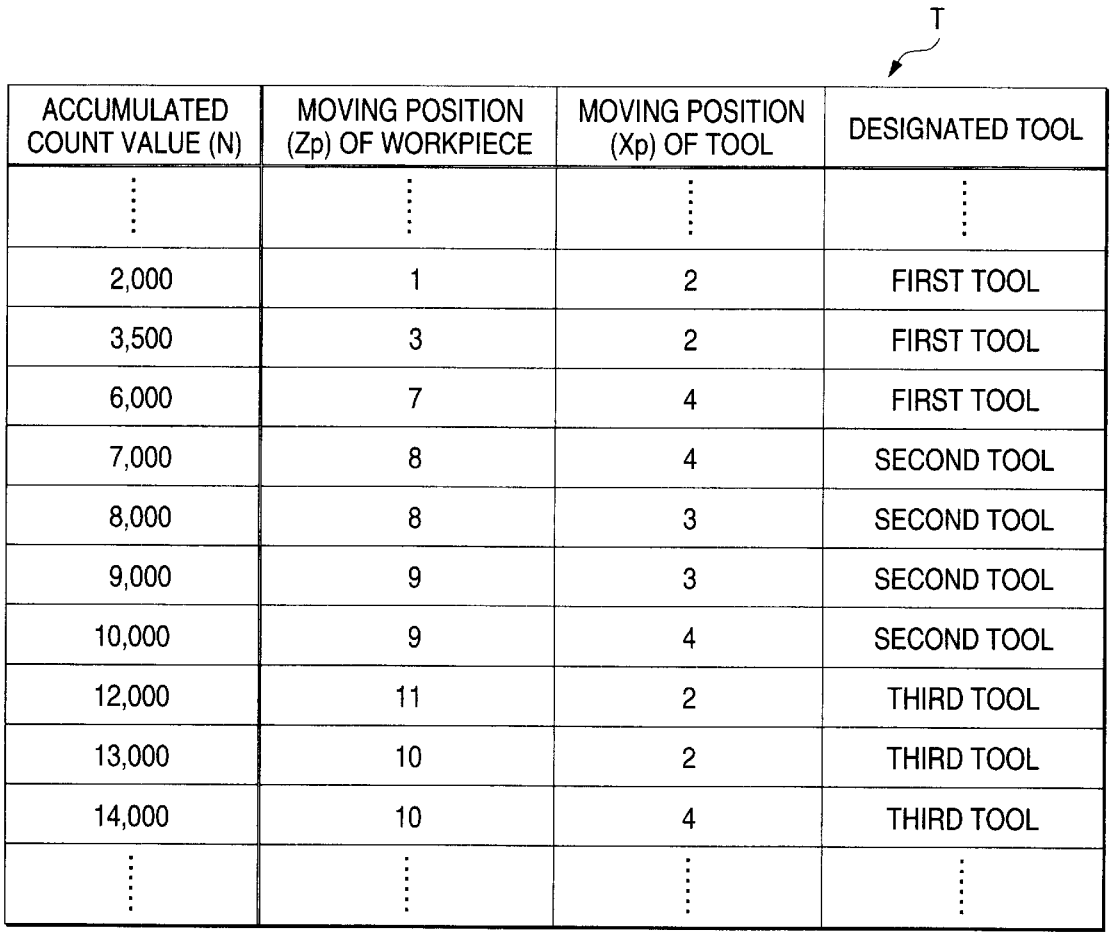
FIG. 3 is a position data table contained in the driving control apparatus for the machine tool according to the embodiment of the invention.

The position data storage portion 25 is configured by a memory such as RAM etc. and stores workpiece position data representing a moving position of the workpiece 2 and tool position data representing the moving position of the tool 3, 4 or 5. The workpiece position data and the tool position data are stored in the form of a position data table T as shown in FIG. 3 corresponding to each of different count values of the number of the rotation detection signals counted by the count portion 23. The position data table T shown in FIG. 3 employs the count values (N) itself of the number of the generated rotation detection signals. Alternatively, the position data table may employ the number of rotations of the spindle rotation motor 11 (spindle) obtained from the count values (N).

In the position data table T, as shown in FIG. 3, the moving position (Zp) of the workpiece 2 and the moving position (Xp) of the tool 3, 4 or 5 are set in correspondence to each of different accumulated count values (N). For example, the moving position (Zp) of the workpiece 2 and the moving position (Xp) of the tool (the first tool 3) when the accumulated count value (N) is "2,000" are set to "1" and "2", respectively. In the position data table T, the tools for machining the workpiece 2 are set and designated in correspondence to each of different accumulated count values (N). For example, "the first tool 3" is set as a designation tool used for the machining for the accumulated count values (N) in a range from "2,000" to "3,500". The position data storage portion 25 is coupled to the CPU 22 so that the moving positions (Zp) of the workpiece 2, the moving positions of the tools 3, 4, 5 and the designation tools stored therein are supplied to the CPU 22 as the workpiece position data, the tool position data and tool designation data, respectively.

Figure 4A:
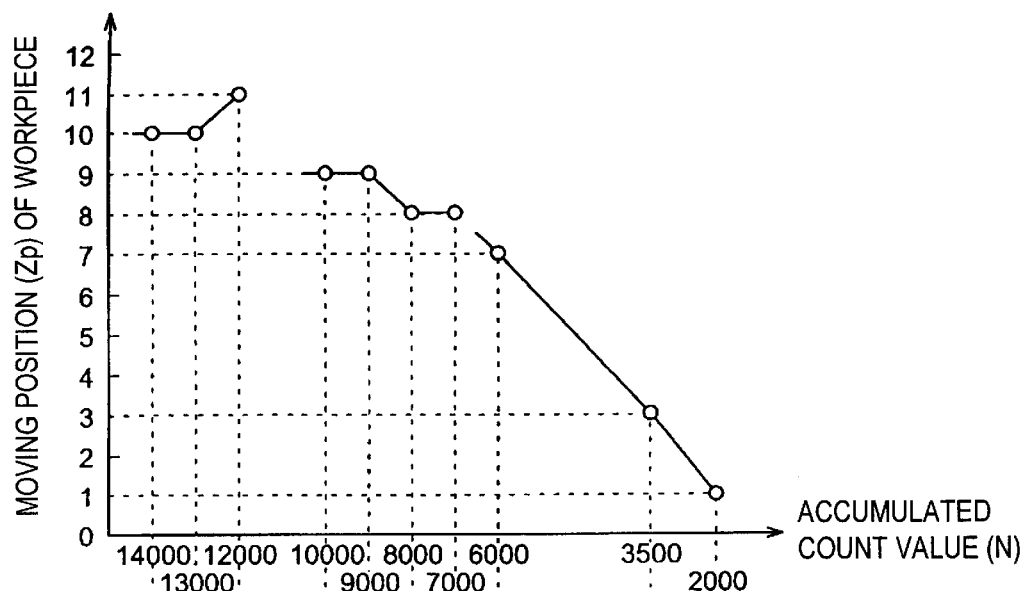
FIG. 4A is an example of a diagram showing loci of the moving positions of the workpiece (loci of the moving position in the Z-axis direction) in machining the workpiece by the driving control apparatus.
Figure 4B:
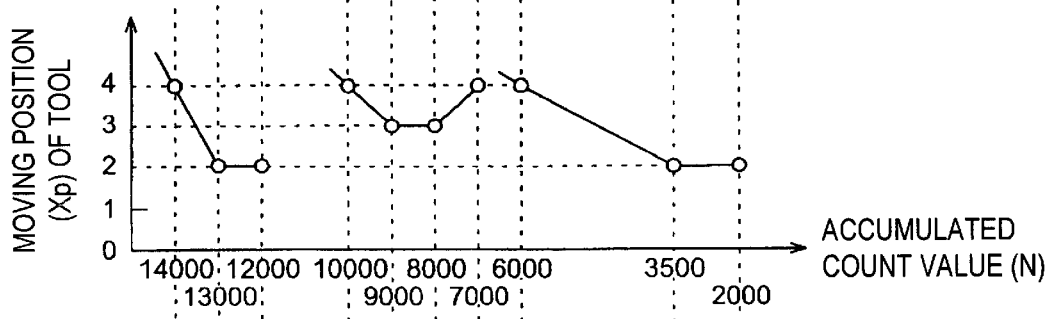
FIG. 4B is an example of a diagram showing loci of the moving positions of the tool (loci of the moving position in the X-axis direction) in machining the workpiece by the driving control apparatus.

The position data table T shown in FIG. 3 is set so as to realize a locus of the moving positions of the workpiece 2 in the Z-axis direction and loci of the tools 3, 4, 5 in the X-axis direction as shown in FIGS. 4A and 4B. FIG. 4A shows the locus of the moving positions of the workpiece 2 in the Z-axis direction for the accumulated count values (N) of the spindle rotation motor 11 (spindle). The workpiece 2 moves from a numeral "1" to a numeral "3" during a period where the accumulated count values (N) reaches "3,500" from "2,000", and moves from the numeral "3" to a numeral "7" during a period where the accumulated count values (N) reaches "6,000" from "3,500". The workpiece 2 remains at a numeral "8" and does not move during a period where the accumulated count values (N) reaches "8,000" from "7,000", moves from the numeral "8" to a numeral "9" during a period where the accumulated count values (N) reaches "9,000" from "8,000", and remains at the numeral "9" and does not move during a period where the accumulated count values (N) reaches "10,000" from "9,000". Then, the workpiece 2 moves from a numeral "11" to a numeral "10" during a period where the accumulated count values (N) reaches "13,000" from "12,000", and remains at the numeral "10" and does not move during a period where the accumulated count values (N) reaches "14,000" from "13,000".

FIG. 4B shows the loci of the moving positions of the tools 3, 4, 5 in the X-axis direction for the accumulated count values (N) of the spindle rotation motor 11 (spindle). The first tool 3 remains at a numeral "2" and does not move during a period where the accumulated count values (N) reaches "3,500" from "2,000", and moves from the numeral "2" to a numeral "4" during a period where the accumulated count values (N) reaches "6,000" from "3,500". The second tool 4 moves from the numeral "4" to a numeral "3" during a period where the accumulated count values (N) reaches "8,000" from "7,000", remains at the numeral "3" and does not move during a period where the accumulated count values (N) reaches "9,000" from "8,000", and moves from the numeral "3" to the numeral "4" during a period where the accumulated count values (N) reaches 10,000" from "9,000". The third tool 5 remains at a numeral "2" and does not move during a period where the accumulated count values (N) reaches "13,000" from "12,000", and moves from the numeral "2" to a numeral "4" during a period where the accumulated count values (N) reaches 14,000" from "13,000".

Figure 4C:
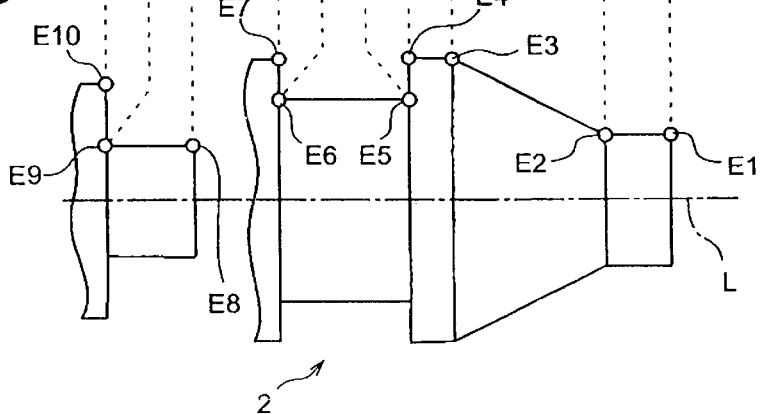
FIG. 4C is an example of a diagram showing the machining shape of the workpiece.

When the workpiece 2 and the tools 3, 4, 5 move in accordance with the loci of the moving positions as described above, the workpiece 2 can be machined (cut) in a shape as shown in FIG. 4C. The workpiece is machined from a point E1 to a point E2 in FIG. 4C during the period where the accumulated count values (N) reaches "3,500" from "2,000", and machined from the point E2 to a point E3 during the period where the accumulated count values (N) reaches "6,000" from "3,500". Also, the workpiece is machined from a point E4 to a point E5 during the period where the accumulated count values (N) reaches "8,000" from "7,000", machined from the point E5 to a point E6 during the period where the accumulated count values (N) reaches "9,000" from "8,000", and machined from the point E6 to a point E7 during the period where the accumulated count values (N) reaches 10,000" from "9,000". Further, the workpiece is machined from a point E8 to a point E9 during the period where the accumulated count values (N) reaches "13,000" from "12,000", and machined from the point E9 to a point E10 during the period where the accumulated count values (N) reaches 14,000" from "13,000".

In this embodiment, the rotation speed of the spindle rotation motor 11 (spindle) is kept at predetermined constant value during the period where the accumulated count values (N) reaches "3,500" from "2,000" (a machining unit from the point E1 to the point E2), during the period where the accumulated count values (N) reaches "6,000" from "3,500" (a machining unit from the point E2 to the point E3), during the period where the accumulated count values (N) reaches "8,000" from "7,000" (a machining unit from the point E4 to the point E5), during the period where the accumulated count values (N) reaches "9,000" from "8,000" (a machining unit from the point E5 to the point E6), during the period where the accumulated count values (N) reaches 10,000" from "9,000" (a machining unit from the point E6 to the point E7), during the period where the accumulated count values (N) reaches "13,000" from "12,000" (a machining unit from the point E8 to the point E9), and during the period where the accumulated count values (N) reaches 14,000" from "13,000" (a machining unit from the point E9 to the point E10), respectively. The rotation speed of the spindle rotation motor 11 (spindle) can be set suitably in accordance with the material etc. of the workpiece 2.

In the position data table T shown in FIG. 3, the accumulated count values (N) of the spindle rotation motor 11 (spindle) to which the moving positions (Zp) of the workpiece 2 and the moving positions (Xp) of the tools 3, 4, 5 are set are the accumulated count values (N) corresponding to the points (E1 to E10 etc.) at which the machining shape is changed such as inflection points, corner portions, curvature changing points etc. as shown in FIG. 4C. The moving positions (Zp) of the workpiece 2 and the moving positions (Xp) of the tools 3, 4, 5 are defined to represent the moving positions at the points(E1 to E10 etc.) where the machining shape is changed. Thus, the linear portions of the machining shape of the workpiece 2 are not divided, and instead the points where the machining shape is changed such as the inflection points, the corner portions, the curvature changing points etc. of a desired shape are set, so that the storage capacity of the position data storage portion 25 for the workpiece position data and the tool position data can be decreased to a large extent.

The ROM 26 is a storage portion for storing various kinds of machining programs. The interface portion 28 is a signal input output portion. It outputs a workpiece position command signal representing the moving position of the workpiece 2 determined by the CPU 22 (as described later) to the workpiece moving motor driving portion 18. It also outputs the tool position command signal representing the moving positions of the tools 3, 4, 5 determined by the CPU 22 (as described later) to the tool moving motor driving portions 15A, 15B, 15C. It also outputs the spindle rotation speed command signal representing the rotation speed of the spindle calculated and determined by the CPU 22 to the spindle rotation motor driving portion 12. It also inputs rotation detecting signals from the pulse encoders 13, 16A, 16B, 16C, 19 to the CPU 22 and the count portion 23. The RAM 29 is configured to temporarily store the various kinds of the calculation results of the CPU 22 so as to be able to read the results therefrom.

Figure 5:
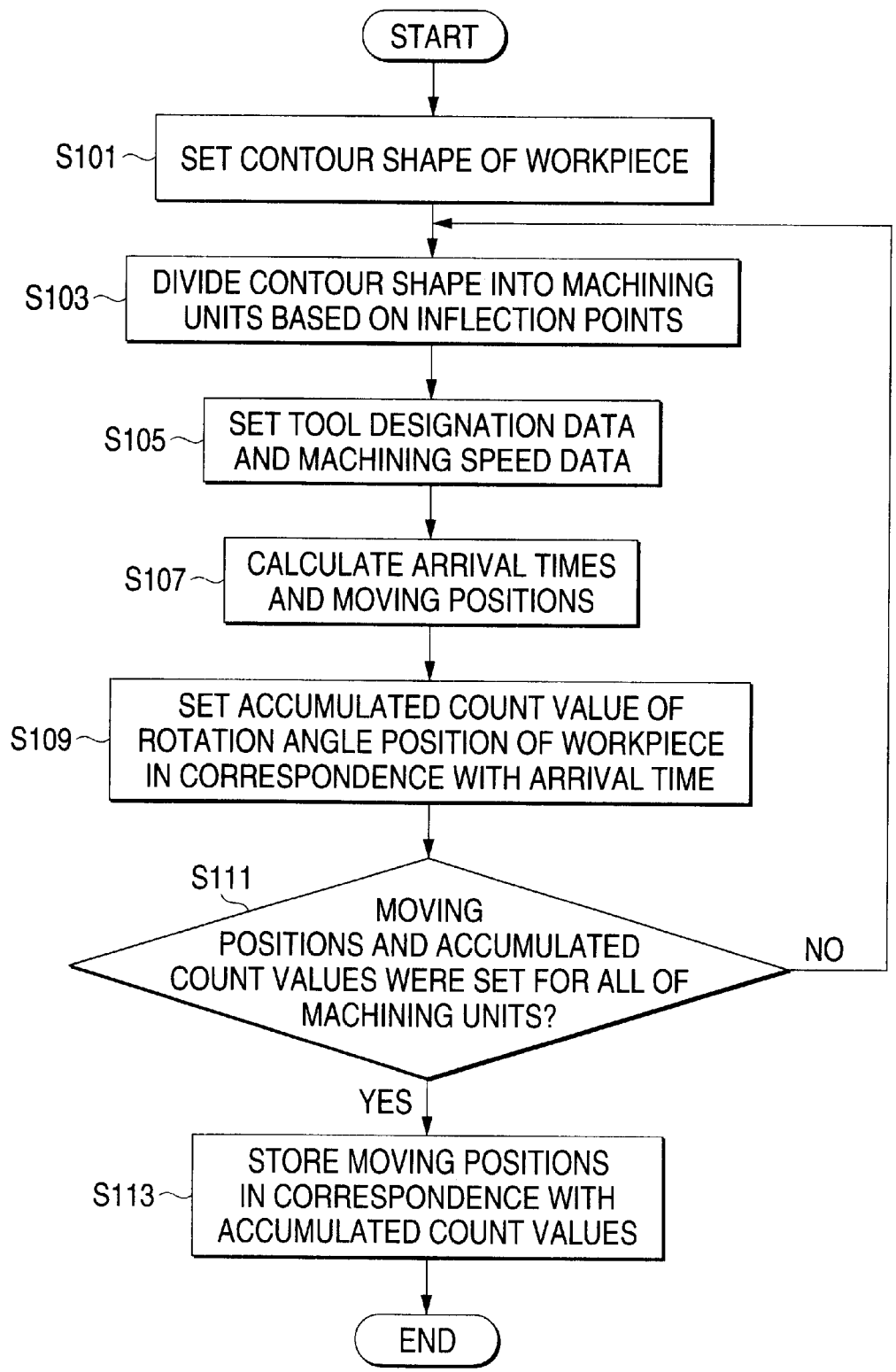
FIG. 5 is a flow chart for explaining the moving position setting method of the machine tool according to the embodiment of the invention.

Next, the explanation will be made based on FIG. 5 as to a method of setting the position data table T shown in FIG. 3 (moving position setting method). The method of setting the position data table T may be executed by a computer system (for example, a personal computer) including a CPU (central processing unit), a memory, an input device such as a mouse and a keyboard, a display device, a storage device such as a hard disc drive apparatus. Alternatively, the method may be executed by the control unit portion 21.

Figure 6:
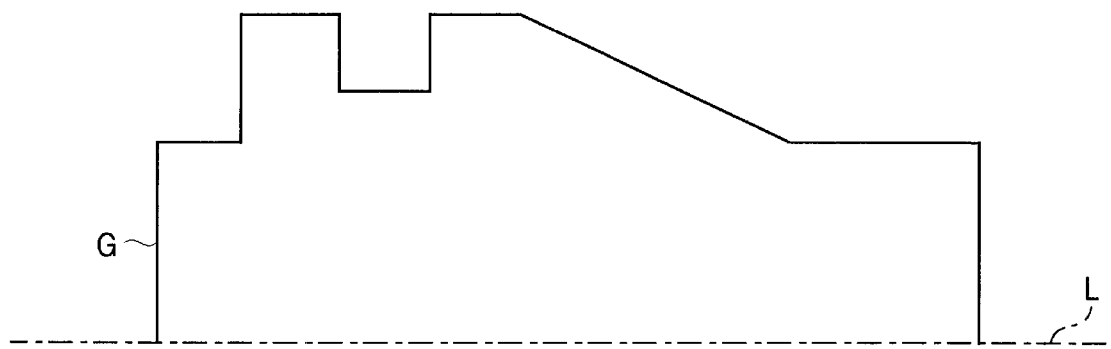
FIG. 6 is a diagram showing an example of a display screen image on the display device of a computer system.

First, the computer system sets a contour shape G at section along the rotation center axis L of the spindle rotation motor 11 (spindle) based on CAD data representing the desired machining shape of the workpiece 2 (S101). The contour shape G thus set is displayed as an image on the display device. Since the workpiece 2 is turned to be machined, an operator can recognize the entirety of the contour shape G even with only the upper half of the contour shape G displayed as shown in FIG. 6.

Figure 7:
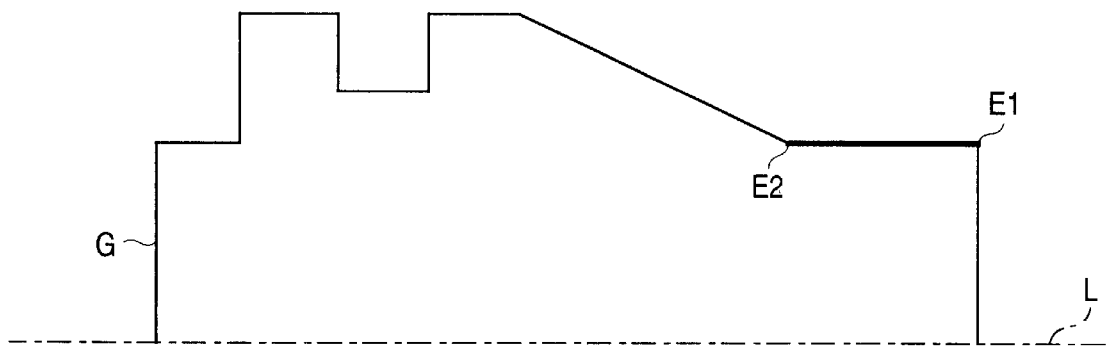
FIG. 7 is a diagram showing an example of the display screen image on the display device of the computer system.
Figure 8:
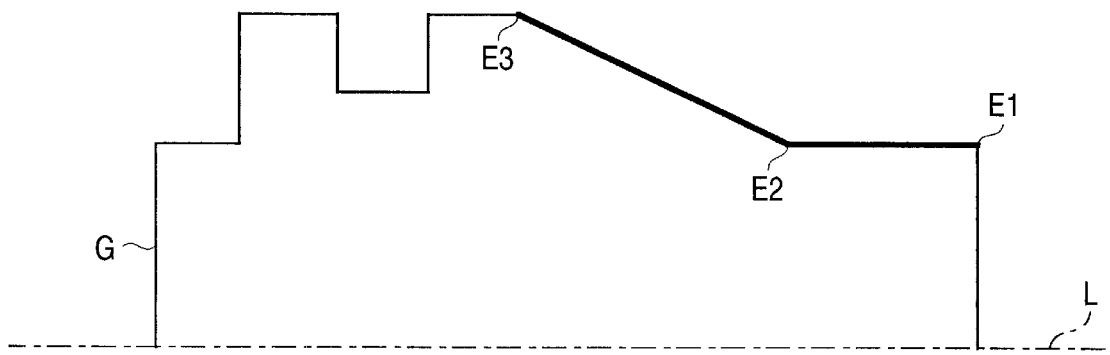
FIG. 8 is a diagram showing an example of the display screen image on the display device of the computer system.

Next, the computer system divides the contour shape G into machining units based on the inflection points contained in the contour shape G (S103: machining unit dividing process). Each of the divided machining units is a segment constituted by a sequence of the inflection points including a machining unit start point and a machining unit endpoint. In this embodiment, when an operator designates two inflection points as the machining unit start point and the machining unit end point, respectively, the computer system sets the machining unit starting from the designated machining unit start point and ending at the designated machining unit endpoint. For example, in the contour shape image G displayed on the display device, when the operator designates the point E1 and the point E2, the machining unit from the point E1 to the point E2 is set as shown in FIG. 7. Succeedingly, when the operator designates the point E2 and the point E3, the machining unit from the point E2 to the point E3 is set as shown in FIG. 8. The division into the machining units may be performed based on the instruction of the operator or may be performed automatically by the computer system.

Figure 14:
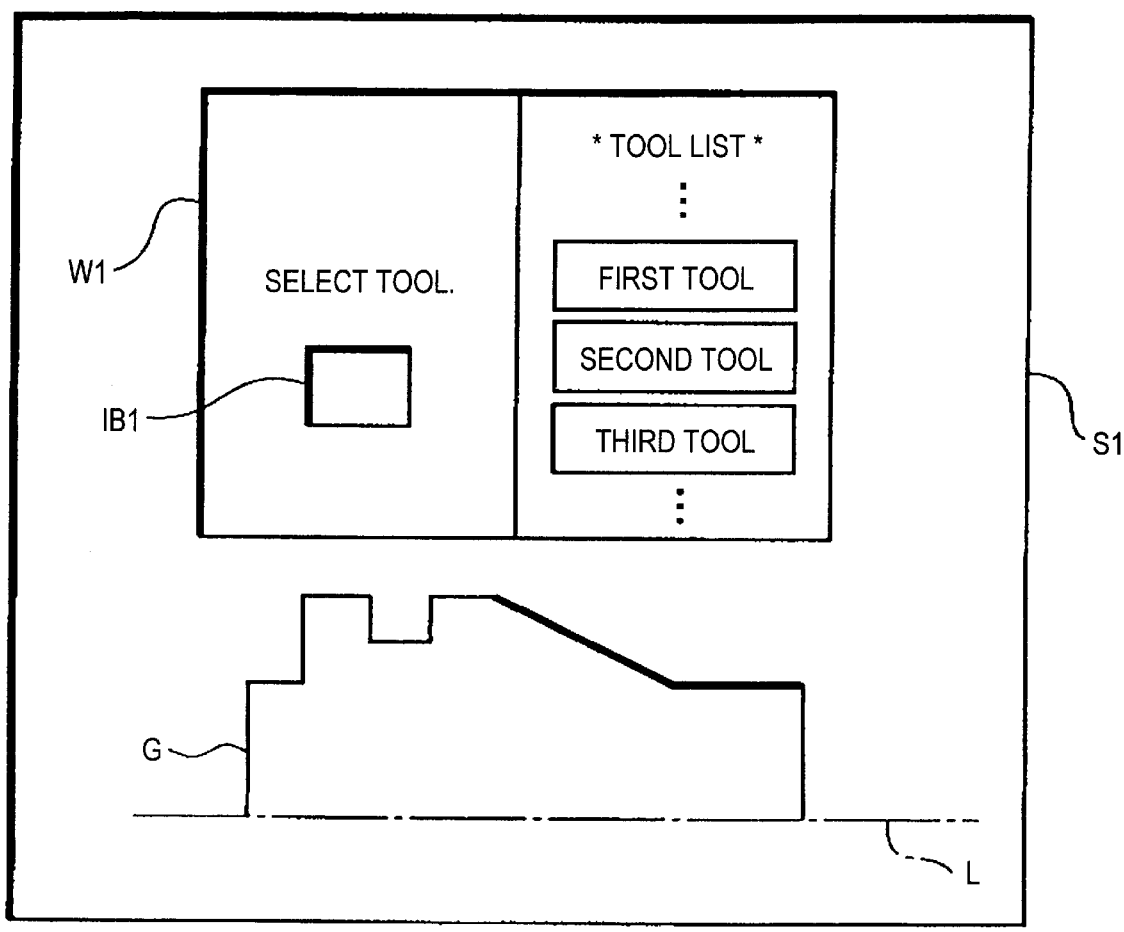
FIG. 14 is a diagram showing an example of the display screen image on the display device of the computer system.

When the contour shape G is divided into the machining units, the computer system sets at least the tool designation data and machining speed data necessary for performing the machining for each of the machining units (S105: machining data setting process). The tool designation data represents the kind of the tool for performing the machining, and the kind of the tool inputted according to the display screen S1 shown in FIG. 14 is set as the tool designation data. The tool designation data can be set by inputting the kind of the tool into the input box IB1 of the tool selection window W1 of the display screen S1. A list of the selectable tools is displayed on the tool selection window W1 of the display screen S1. In the display screen S1, the present machining unit is distinguished by a bold line in the contour shape image G. For example, when the kind of the tool (for example, the first tool 3) is inputted into the input box IB1 for the machining units from the point E1 to the point E2 and from the point E2 to the point E3 (a portion displayed by the bold line in FIG. 14), the inputted tool (the first tool 3) is set as the tool designation data necessary for performing the machining for the machining units from the point E1 to the point E2 and from the point E2 to the point E3.

Figure 15:
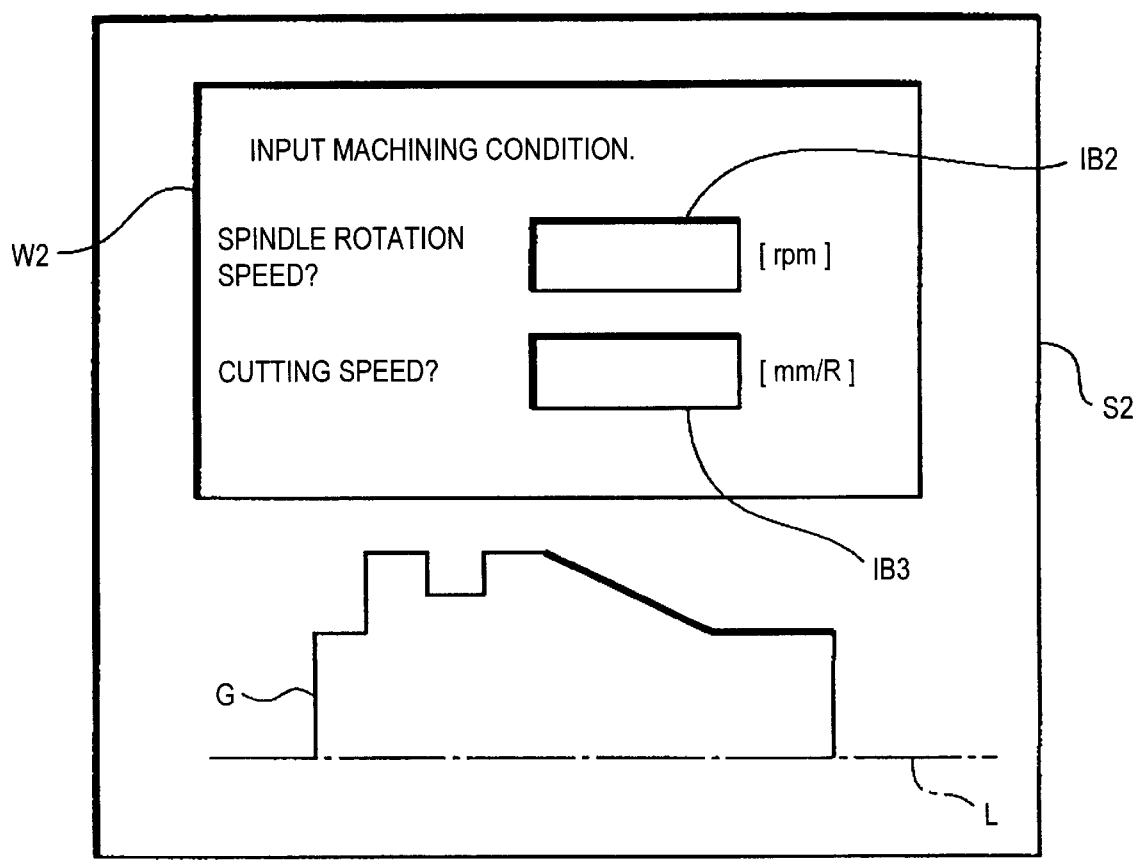
FIG. 15 is a diagram showing an example of the display screen image on the display device of the computer system.

The machining speed data represents the machining speed by the tool thus set, and a spindle rotation speed and a cutting speed inputted in accordance with a display screen S2 shown in FIG. 15 are set as the machining speed data. The machining speed data is set by inputting the spindle rotation speed into an input box IB2 and inputting the cutting speed into an input box IB3 of the machining speed setting window W2 of the display screen S2. In the display screen S2, like the display screen S1, the present machining unit is distinguished by a bold line in the contour shape image G. For example, when the spindle rotation speed (for example, 3,000 rpm) is inputted into the input box IB2 and the cutting speed (for example, 0.1 mm/R) is inputted into the input box IB3 for the machining unit from the point E1 to the point E2 (a part of the bold line in FIG. 15), the spindle rotation speed (3,000 rpm) and the cutting speed (0.1 mm/R) thus inputted are set as the machining speed data for the machining unit from the point E1 to the point E2. Further, when the spindle rotation speed (for example, 3,000 rpm) is inputted into the input box IB2 and the cutting speed (for example, 0.1 mm/R) is inputted into the input box IB3 for the machining unit from the point E2 to the point E3 (a part of the bold line in FIG. 15), the spindle rotation speed (3,000 rpm) and the cutting speed (0.1 mm/R) thus inputted are set as the machining speed data for the machining unit from the point E2 to the point E3. The unit "mm/R" represents a distance advanced per one revolution.

In the aforesaid explanation, the machining units from the point E1 to the point E2 and from the point E2 to the point E3 are set in S103 (the machining unit dividing process), and the tool designation data is set for those machining units, and then the machining speed data is set for the machining units from the point E1 to the point E2 and from the point E2 to the point E3 in S105 (the machining data setting process). However, the embodiment may be arranged in a manner that the machining unit from the point E1 to the point E2 is set and the tool designation data and the machining speed data are set for the machining unit from the point E1 to the point E2, and thereafter the machining unit from the point E2 to the point E3 is set and the tool designation data and the machining speed data are set for the machining unit from the point E2 to the point E3.

When the tool designation data and the machining speed data are set, the computer system calculates an arrival time at each of the inflection points to be reached during machining along the sequence of the inflection points (machining time required for the machining unit). The calculation is based on the contour shape G or the CAD data (distance of the machining unit) and the machining speed data (cutting speed for the machining unit). The computer system also calculates absolute values of the moving positions of the workpiece 2 and the tools corresponding to the respective inflection points (S107: calculation process). The absolute values are numerical values of the respective ordinates shown in FIGS. 4A and 4B, representing distances from unique reference positions of the X-axis and the Z-axis, respectively. For example, a machining time required for the machining unit from the point E1 to the point E2 is calculated based on the distance of the machining unit from the point E1 to the point E2 and the machining speed data (cutting speed) for the same machining unit. Then, absolute values of the moving positions of the workpiece 2 and the tool (the first tool 3) at the point E1 and those at the point E2 are calculated based on the CAD data for the machining unit from the point E1 to the point E2. Also, a machining time required for the machining unit from the point E2 to the point E3 is calculated based on the distance of the machining unit from the point E2 to the point E3 and the machining speed data (cutting speed) for the same machining unit. Then, absolute values of the moving positions of the workpiece 2 and the tool (the first tool 3) at the point E3 are calculated based on the CAD data for the machining unit from the point E2 to the point E3.

Next, the computer system sets the rotation angle position of the workpiece 2 as an accumulated value (accumulated count value) in correspondence to the arrival time for each of the machining units (S109: rotation angle position setting process). In this case, since the spindle rotation speed is set as the machining speed data, the accumulated count value necessary for the machining is calculated based on the spindle rotation speed. For example, the number of rotations (for example, 1,500) of the spindle (the workpiece 2) during the time necessary for the machining unit from the point E1 to the point E2 is calculated, and the calculated number is added to the accumulated count value (for example, 2,000) of the point E1 thereby to calculate the accumulated count value (for example, 3,500) of the point E2. Then, the number of rotations (for example, 2,500) of the spindle (the workpiece 2) during the time necessary for the machining unit from the point E2 to the point E3 is calculated, and the calculated number is added to the accumulated count value of the point E2 thereby to calculate the accumulated count value (for example, 6,000) of the point E3.

Next, the computer system determines whether or not the moving positions and the accumulated count values of the workpiece 2 and the tools were calculated for all of the machining units (S111). When the moving positions and the accumulated count values of the workpiece 2 and the tools have not been calculated for all of the machining units ("No" in S111), the procedure returns to S103 (the machining unit dividing process) and the steps from S103 to S109 are repeated. When the moving positions and the accumulated count values of the workpiece 2 and the tools are calculated and set for the machining units from the point E1 to the point E3, the moving positions and accumulated count values of the workpiece 2 and the tools are calculated and set for the machining units from the point E4 to the point E7 in the following manner.

Figure 9:
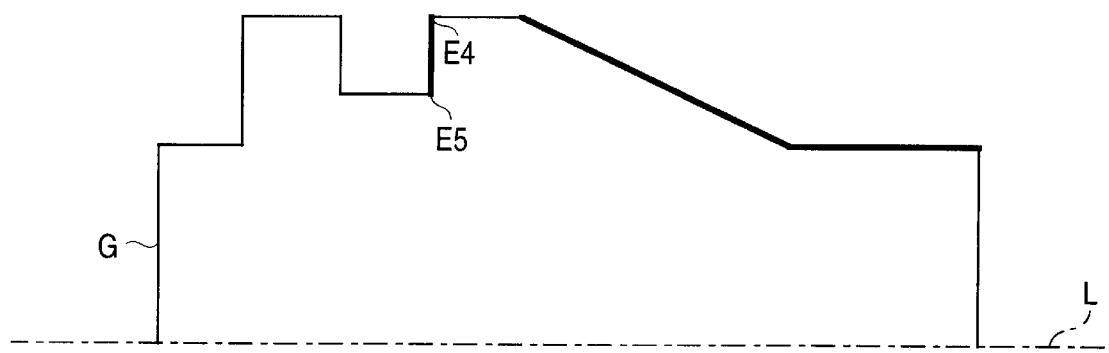
FIG. 9 is a diagram showing an example of the display screen image on the display device of the computer system.
Figure 10:
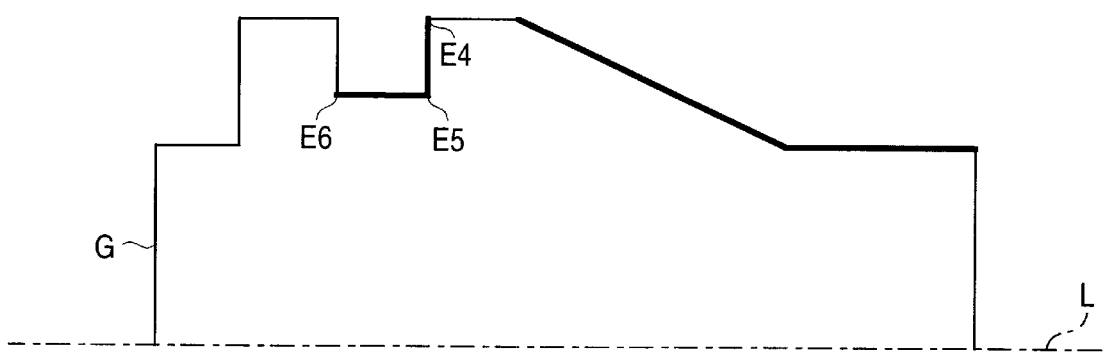
FIG. 10 is a diagram showing an example of the display screen image on the display device of the computer system.
Figure 11:
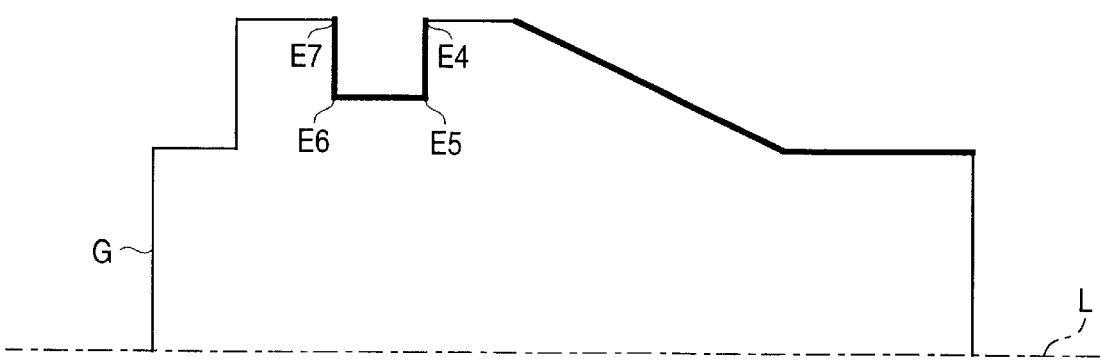
FIG. 11 is a diagram showing an example of the display screen image on the display device of the computer system.

For example, in the contour shape image G displayed on the display device, when the operator designates the point E4 and the point E5, the machining unit from the point E4 to the point E5 is set as shown in FIG. 9. Succeedingly, when the operator designates the point E5 and the point E6, the machining unit from the point E5 to the point E6 is set as shown in FIG. 10. Also, when the operator designates the point E6 and the point E7, the machining unit from the point E6 to the point E7 is set as shown in FIG. 11.

When the kind of the tool (for example, the second tool 4) is inputted into the input box IB1 of the tool selection window W1 of the display screen S1 for the machining units from the point E4 to the point E5, from the point E5 to the point E6 and from the point E6 to the point E7, the inputted tool (the second tool 4) is set as the tool designation data necessary for performing the machining for those machining units.

When the spindle rotation speed (for example, 2,000 rpm) is inputted into the input box IB2 of the machining speed setting window W2 of the display screen S2 and the cutting speed (for example, 0.1 mm/R) is inputted into the input box IB3 for the machining unit from the point E4 to the point E5, the spindle rotation speed (2,000 rpm) and the cutting speed (0.1 mm/R) thus inputted are set as the machining speed data for the machining unit from the point E4 to the point E5. Further, when the spindle rotation speed (for example, 2,000 rpm) is inputted into the input box IB2 and the cutting speed (for example, 0.1 mm/R) is inputted into the input box IB3 for the machining unit from the point E5 to the point E6, the spindle rotation speed (2,000 rpm) and the cutting speed (0.1 mm/R) thus inputted are set as the machining speed data for the machining unit from the point E5 to the point E6. Furthermore, when the spindle rotation speed (for example, 2,000 rpm) is inputted into the input box IB2 and the cutting speed (for example, 0.1 mm/R) is inputted into the input box IB3 for the machining unit from the point E6 to the point E7, the spindle rotation speed (2,000 rpm) and the cutting speed (0.1 mm/R) thus inputted are set as the machining speed data for the machining unit from the point E6 to the point E7.

Succeedingly, a machining time required for the machining unit from the point E4 to the point E5 is calculated based on the distance of the machining unit from the point E4 to the point E5 and the machining speed data (cutting speed) for the same machining unit. Then, absolute values of the moving positions of the workpiece 2 and the tool (the second tool 4) at the point E4 and those at the point E5 are calculated based on the CAD data for the machining unit from the point E4 to the point E5. Also, a machining time required for the machining unit from the point E5 to the point E6 is calculated based on the distance of the machining unit from the point E5 to the point E6 and the machining speed data (cutting speed) for the same machining unit. Then, absolute values of the moving positions of the workpiece 2 and the tool (the second tool 4) at the point E6 are calculated based on the CAD data for the machining unit from the point E5 to the point E6. Further, a machining time required for the machining unit from the point E6 to the point E7 is calculated based on the distance of the machining unit from the point E6 to the point E7 and the machining speed data (cutting speed) for the same machining unit. Then, absolute values of the moving positions of the workpiece 2 and the tool (the second tool 4) at the point E7 are calculated based on the CAD data for the machining unit from the point E6 to the point E7.

Then, the number of rotations (for example, 1,000) of the spindle (the workpiece 2) during the time necessary for the machining unit from the point E4 to the point E5 is calculated, and the calculated number is added to the accumulated count value (for example, 7,000) at the point E4 thereby to calculate the accumulated count value (for example, 8,000) of the point E5. Similarly, the accumulated count value (for example, 9,000) at the point E6 and the accumulated count value (for example, 10,000) at the point E7 are calculated and set.

Figure 12:
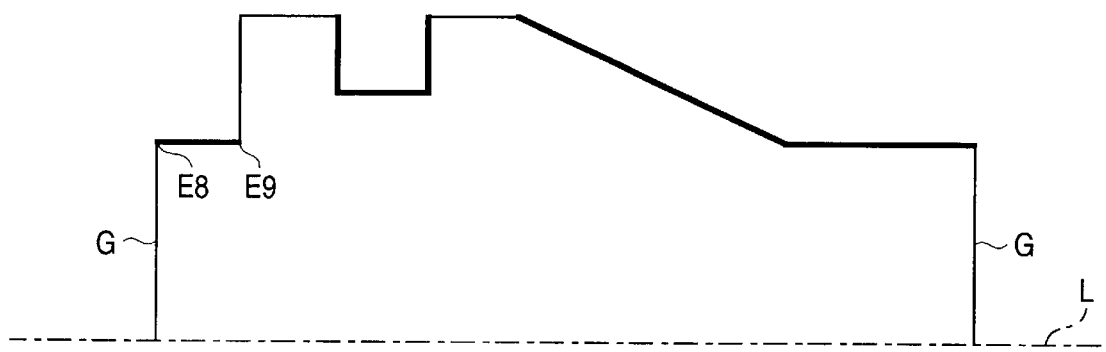
FIG. 12 is a diagram showing an example of the display screen image on the display device of the computer system.
Figure 13:
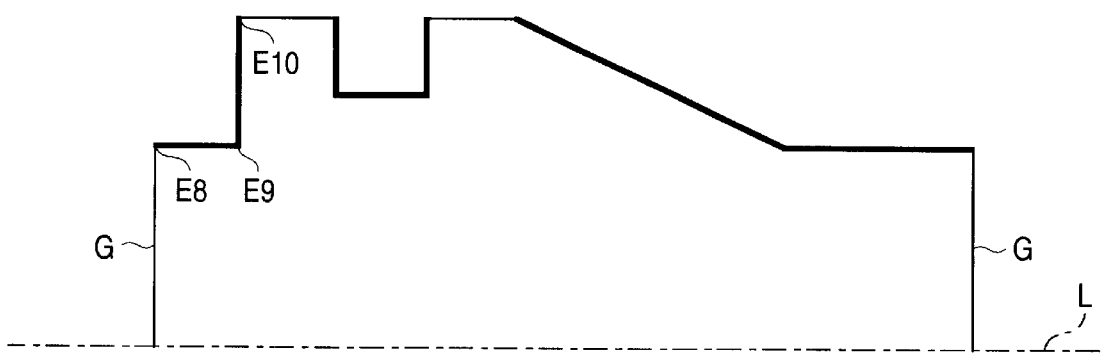
FIG. 13 is a diagram showing an example of the display screen image on the display device of the computer system.

When the moving positions and the accumulated count values of the workpiece 2 and the tools are calculated and set for the machining units from the point E4 to the point E7, the moving positions and the accumulated count values of the workpiece 2 and the tools are calculated and set for the machining units from the point E8 to the point E10 in the following manner. For example, in the contour shape image G displayed on the display device, when the operator designates the point E8 and the point E9, the machining unit from the point E8 to the point E9 is set as shown in FIG. 12. Succeedingly, when the operator designates the point E9 and the point E10, the machining unit from the point E9 to the point E10 is set as shown in FIG. 13.

When the kind of the tool (for example, the third tool 5) is inputted into the input box IB1 of the tool selection window W1 of the display screen S1 for the machining units from the point E8 to the point E9 and from the point E9 to the point E10, the inputted tool (the third tool 5) is set as the tool designation data necessary for performing the machining for those machining units.

When the spindle rotation speed (for example, 3,000 rpm) is inputted into the input box IB2 of the machining speed setting window W2 of the display screen S2 and the cutting speed (for example, 0.1 mm/R) is inputted into the input box IB3 for the machining unit from the point E8 to the point E9, the spindle rotation speed (3,000 rpm) and the cutting speed (0.1 mm/R) thus inputted are set as the machining speed data for the same machining unit. Further, when the spindle rotation speed (for example, 2,000 rpm) is inputted into the input box IB2 and the cutting speed (for example, 0.2 mm/R) is inputted into the input box IB3 for the machining unit from the point E9 to the point E10, the spindle rotation speed (2,000 rpm) and the cutting speed (0.2 mm/R) thus inputted are set as the machining speed data for the same machining unit.

Succeedingly, a machining time required for the machining unit from the point E8 to the point E9 is calculated based on the distance of the machining unit from the point E8 to the point E9 and the machining speed data (cutting speed) for the same machining unit. Then, absolute values of the moving positions of the workpiece 2 and the tool (the third tool 5) at the point E8 and those at the point E9 are calculated based on the CAD data for the machining unit from the point E8 to the point E9. Also, a machining time required for the machining unit from the point E9 to the point E10 is calculated based on the distance of the machining unit from the point E9 to the point E10 and the machining speed data (cutting speed) for the same machining unit. Then, absolute values of the moving positions of the workpiece 2 and the tool (the third tool 5) at the point E10 are calculated based on the CAD data for the machining unit from the point E9 to the point E10.

Then, the number of rotations (for example, 1,000) of the spindle (the workpiece 2) during the time necessary for the machining unit from the point E8 to the point E9 is calculated, and the calculated number is added to the accumulated count value (for example, 12,000) at the point E8 thereby to calculate the accumulated count value (for example, 13,000) at the point E9. Similarly, the accumulated count value (for example, 14,000) at the point E10 is calculated and set.

As described above, when the moving positions and the accumulated count values of the workpiece 2 and the tools are calculated and set for all of the machining units, the computer system stores the moving positions of the workpiece 2 and the tools calculated in S107 (the calculation process) in the position data storage portion 25 of the control unit portion 21 as the position data in correspondence to the rotation angle positions (the accumulated count values) of the workpiece set in S109 (the rotation angle position setting process), in the form of the position data table T (S113: position data storage process). Thus, the position data table T is defined in which the moving positions(Zp)of the workpiece 2 and the moving positions (Xp)of the tools 3, 4, 5 are set in correspondence to the accumulated count values, respectively. The contents of the position data table T is stored as electronics data. In S113 (the position data storage process), the tools set as the tool designation data are stored in the position data table T in correspondence to the accumulated count values, respectively.

Figure 16:
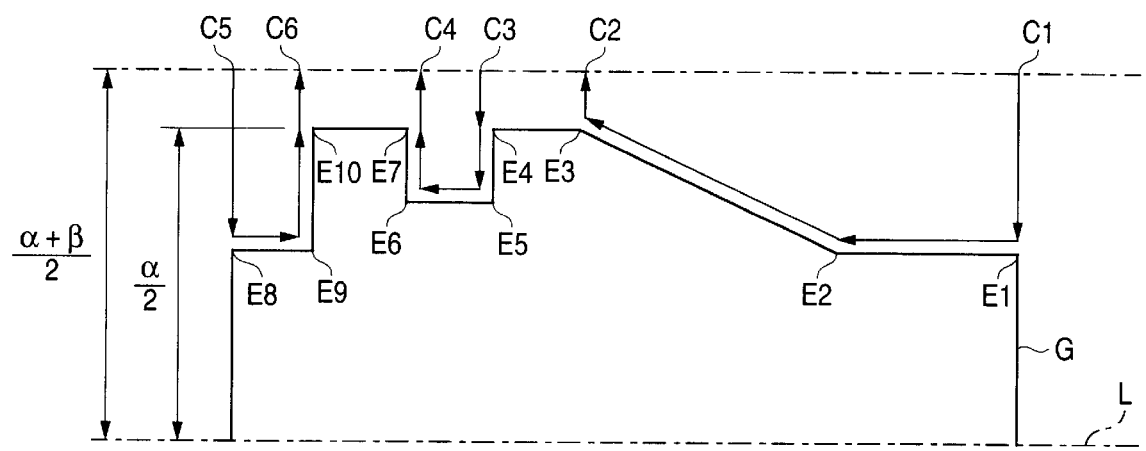
FIG. 16 is a diagram showing an example of the display screen image on the display device of the computer system.

The machining loci of the tools 3, 4, 5 are defined based on the moving positions (Zp) of the workpiece 2, the moving positions (Xp) of the tools 3, 4, 5, and the designation of the tools 3, 4, 5 respectively defined in the position data table T. It is shown by bold lines with arrows on the display device of the computer system as shown in FIG. 16. Symbols C1, C2, C3, C4, C5, C6 in FIG. 16 locate at the position of a diameter α+β which is slightly larger than the diameter α of the workpiece 2, and so an inner area of this position (the center line side) defines a machining area where the tools 3, 4, 5 move at predetermined machining speed. That is, the first tool 3 starts the machining operation from the position C1 and terminates the machining operation at the position C2 through the points E1, E2 and E3. Thus, the dividing procedures shown in FIGS. 7 to 13 can be confirmed again by the display of the machining loci shown in FIG. 16.

The tool is exchanged from the first tool 3 to the second tool 4 between the positions C2 and C3. Thus, the first tool 3 is evacuated and the second tool 4 is entered between the position of the accumulated count value "6,000" (the point E3) and the position of the accumulated count value "7,000" (the point E4) shown in FIG. 3. Although the detailed explanation is omitted, the control unit portion 21 (the CPU 22) shown in FIG. 1 generates various control commands. Further, in the case of executing an interference check for determining whether an interference of tools exists at least due to the movements of the tools, when it is found that an interference of tools exists between the positions C2 and C3, an additional time is added between the positions C2 and C3 and so the accumulated count value "7,000" corresponding to the point E4 is automatically changed into a larger value such as "7,500" etc. and stored. In this case, the moving position (Zp) of the workpiece 2, the moving position (Xp) of the tool (the second tool 4) and the designation of the tool corresponding to the point E4 are not changed at all. In this manner, it can be performed easily to add an additional time between the machining units. Further, since the tool is also exchanged from the second tool 4 to the third tool 5 between the positions C4 and C5, the aforesaid interference check may also be executed.

Succeedingly, the explanation will be made with reference to FIGS. 17 to 20 as to a cutting stock addition step. By adding a cutting stock to the machining unit, the machining unit start point or the machining unit end point is extended along the line to obtain a new machining unit start point or a new machining unit end point. The cutting stock is added in order to more smoothly perform the machining for the machining units set in S103 (the machining unit dividing process). The cutting stock addition step is executed at a later stage of the aforesaid S103.

Figure 17:
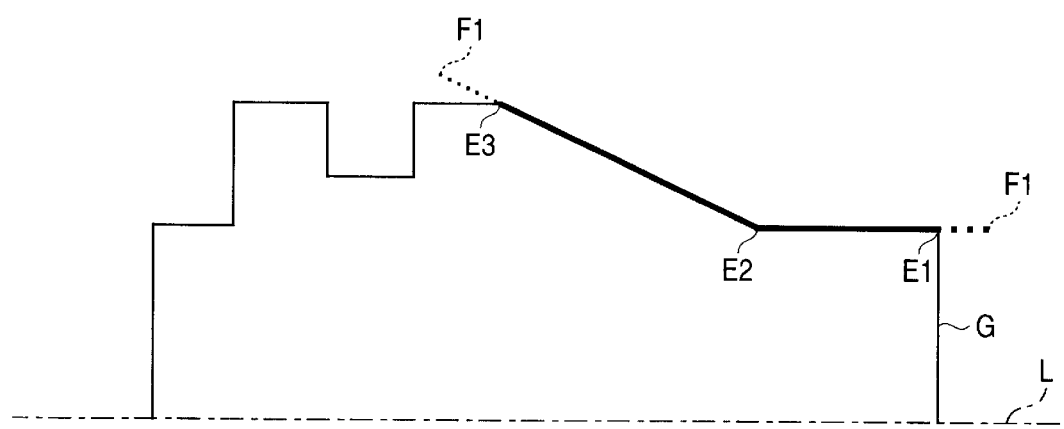
FIG. 17 is a diagram showing an example of the display screen image on the display device of the computer system.
Figures 18, 19:
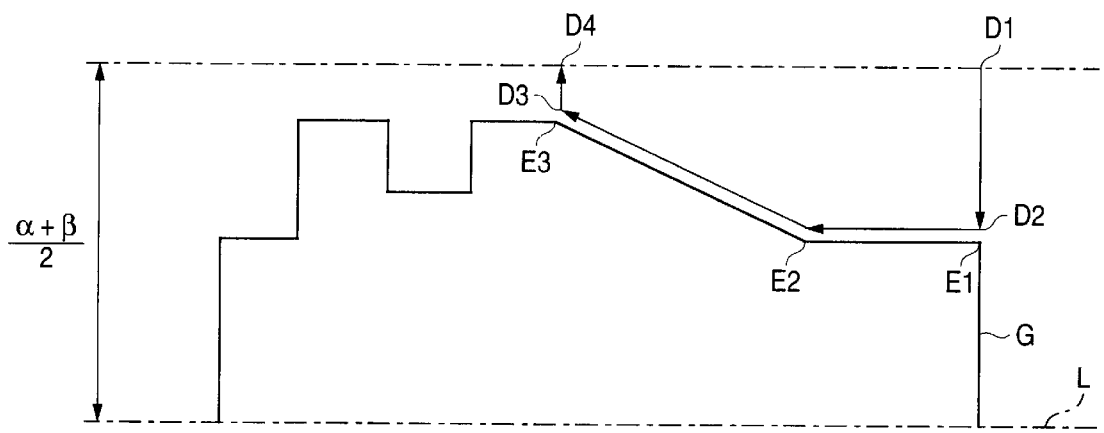
FIG. 18 is a diagram showing an example of the display screen image on the display device of the computer system.
FIG. 19 is a position data table contained in the driving control apparatus for the machine tool according to the embodiment of the invention.

FIG. 17 shows the screen for setting the cutting stock and such a screen is displayed on the display device of the computer system. For example, after the machining unit from the point E1 to the point E2 and the machining unit from the point E2 to the point E3 are set, the operator selects the point E1 and designates a predetermined distance (for example, 0.5 mm in the axial direction). Then, the computer system adds a section of a dot line F1 to E1 as the cutting stock before the point E1 on an extended line of the machining locus E1 to E2. Further, when the operator selects the point E3 and designates a predetermined distance (for example, 0.1 mm in the radial direction), the computer system adds a section of a dot line E3 to F2 as the cutting stock after the point E3 on an extended line of the machining locus E2 to E3. As a result, the machining locus by the tool (the first tool 3) is displayed as a bold line with an arrow on the display device of the computer system as shown in FIG. 18. Each of symbols D1, D2, D3, D4 in FIG. 18 show positions added with a cutting stock. That is, it is displayed that the first tool 3 starts the machining operation from the position D1 and terminates the machining operation at the position D4 through D2, E1, E2, E3 and D3.

By adding the aforesaid cutting stock, the contents of the position data table T corresponding to FIG. 3 are changed as shown in FIG. 19. The moving position (Zp) of the workpiece 2 of a numeral value "0.5" in FIG. 19 corresponds to the moving position (Zp) of the workpiece 2 of a numeral value "1" in FIG. 3. Since the F1 is on an extended line of the moving velocity of E1 and E2, the corresponding accumulated count value (N) is subjected to the proportional calculation as shown below and obtained as "1,625".

$$(3,500-2,000)/(3-1)=(3,500-N)/(3-0.5)$$

For the position D3, since the moving position (Xp) of the tool (the first tool 3) is changed from "4" to "4.1" added with the cutting stock, so that the corresponding accumulated count value (N) is subjected to the proportional calculation as shown below and obtained as "6,125".

$$(6,000-3,500)/(4-2)=(N-3,500)/(4.1-2)$$

Further, the moving position (Zp) of the workpiece 2 is subjected to the proportional calculation as shown below and obtained as $$(6,000-3,500)/(7-3)=(6,125-3,500)/(Zp-3)$$

Figure 20:
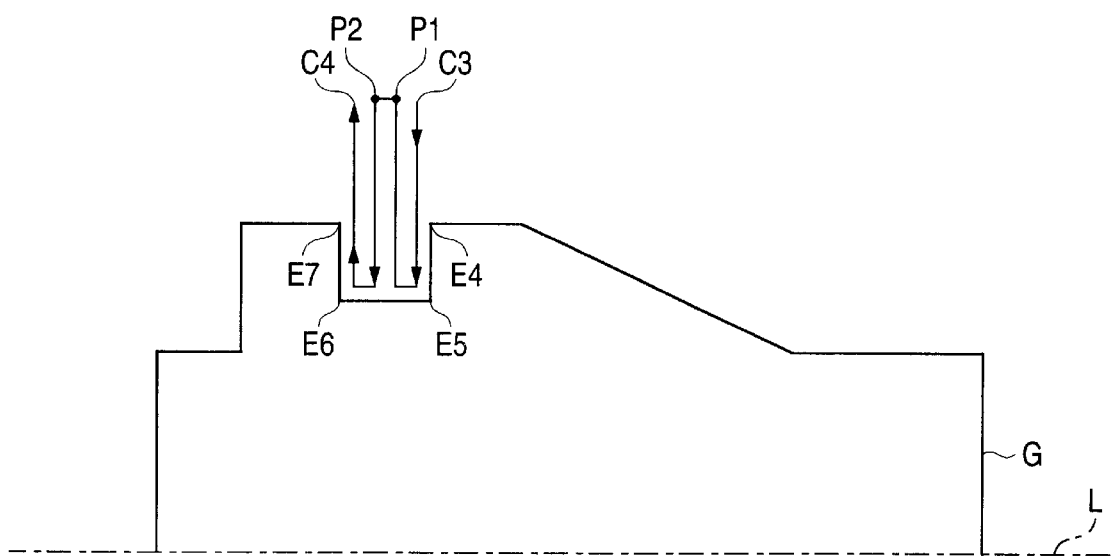
FIG. 20 is a diagram showing an example of the display screen image on the display device of the computer system.

The machining locus by the second tool 4 is displayed as a bold line with an arrow on the display device of the computer system as shown in FIG. 20. The machining locus by the second tool 4 for the machining unit from the point E5 to the point E6 is shown linearly in FIG. 16, whilst shown in a divided manner in FIG. 20. This is because the second tool 4 has a cutting blade of a predetermined width as shown in FIG. 2. After the tool reaches the point E5, a return process (E5 to P1) is added and the moving position (Zp) of the workpiece 2 is shifted from a point P1 to a point P2 and thereafter the tool reaches the point E6 through the cutting process (P2 to E6) again. In this manner, the pattern of the moving locus (the machining locus) of the tool may be set in advance according to the width of the cutting blade of the tool. For example, the machining locus shown in FIG. 16 may be visualized as shown in FIG. 20.

The configuration data of the tool itself such as a width of the cutting blade is preferably set in advance before starting the setting of the moving position. However, it is likely that an operator wants a new tool during the setting operation of the moving position. Thus, the tool selection window (FIG. 14) may be arranged to provide an input for some data of the selected tool such as a shape.

As described above, according to the embodiment, in the machining unit dividing process (S103), the contour shape G at section along the predetermined axis is divided into the machining units, each comprising a plurality of inflection points including the machining unit start point and the machining unit end point. In the machining data setting process (S105), at least the machining speed data necessary for performing the machining is set for the machining unit. Further, the calculation process (S107) calculates, based on the machining speed data set at the earlier process, the arrival times at the respective inflection points to be reached during machining along the sequence of the inflection points. The moving positions (Zp), (Xp) of the workpiece 2 and the tools 3, 4, 5 corresponding to the respective inflection points are also calculated in the calculation process (S107). Then, in the rotation angle position setting process (S109), the rotation angle positions of the workpiece 2 in correspondence to the arrival times are set as the accumulated count values (N) for the machining units, respectively.

In this manner, the contour shape G is divided into the machining units based on the contour shape G of the finished workpiece 2, and the moving positions (Zp), (Xp) of the workpiece 2 and the tool 3, 4 or 5 are set for each of the machining units. Thus, the moving positions (Zp), (Xp) of the workpiece 2 and the tools 3, 4, 5 thus set are suitable for the actual machining operation of the machine tool 1 for machining the respective machining units and so the position data etc. can be set easily without error. In particular, since the contour shape is divided into the machining units by the inflection points of the contour shape G, the moving positions can be inputted accurately by a small amount of the position data Since the moving position setting method according to the embodiment is a setting method suitable for the actual machining operation, the machining know-how of the operator is utilized for the setting operations such as how to divide the contour shape and how to set the machining order. Thus, the machining efficiency is improved with the help of the machining know-how of the skilled operator.

Further, since the moving positions (Zp), (Xp) of the workpiece 2 and the tool 3, 4 or 5 for each of the machining units are set for the accumulation value (N), the position data at the both ends of the machining unit does not change at the time of the calculation due to re-division, insertion, addition etc. of the machining unit. Any error to be accumulated by such calculation does not influence on the position data of other machining units. Further, at the time of the actual machining, since a moving command for controlling the movements of the workpiece 2 and the tools 3, 4, 5 is outputted based on the moving positions (position data) thus calculated, there does not occur cumulative error to the dimensions of the machined workpiece 2. As a result, accurate machining by the machine tool 1 can be realized.

Further, the embodiment preferably further includes the cutting stock addition process in which the machining unit start point or the machining unit endpoint is extended with the addition of a cutting stock to obtain a new machining unit start point or a new machining unit end point. The cutting stock is an area which is finally cut off or an area in which the tool is moved as if the machining is performed. With the addition of a cutting stock to an actual machining area, the movement of the workpiece 2 is made continuous under the same machining condition around the machining start portion and the machining end portion. Thus, the machining is stably performed with good accuracy. Further, the setting of such a cutting stock can be performed easily.

Further, the embodiment preferably further includes the position data storage process (S113). Thus, the moving positions (Zp), (Xp) of the workpiece 2 and the tool 3, 4 or 5 calculated in the calculation process (S107) is stored as the position data in correspondence to each of the rotation angle positions of the workpiece 2 set in the rotation angle position setting process (S109). Thus, the moving positions can be suitably stored as the position data.

Further, according to the embodiment, the tool designation data for each of the machining units is set in the machining data setting process (S105). Thus, the tools 3, 4, 5 to be used in the respective machining units can be determined suitably.

Further, according to the embodiment, since the spindle rotation speed is set for each of the machining units in the machining data setting process (S105), the accumulated count values (N) in the position data table T shown in FIG. 3 correspond to the spindle rotation speeds of the designated machining units, respectively. Thus, even when the spindle rotation speed is in a high rotation speed state or a low rotation speed state, or even when the spindle rotation speed is changed between the machining units, the position data table T shown in FIG. 3 or FIG. 19 can be prepared in accordance with the procedure (the moving position setting method) shown in FIG. 5.

Figure 21:
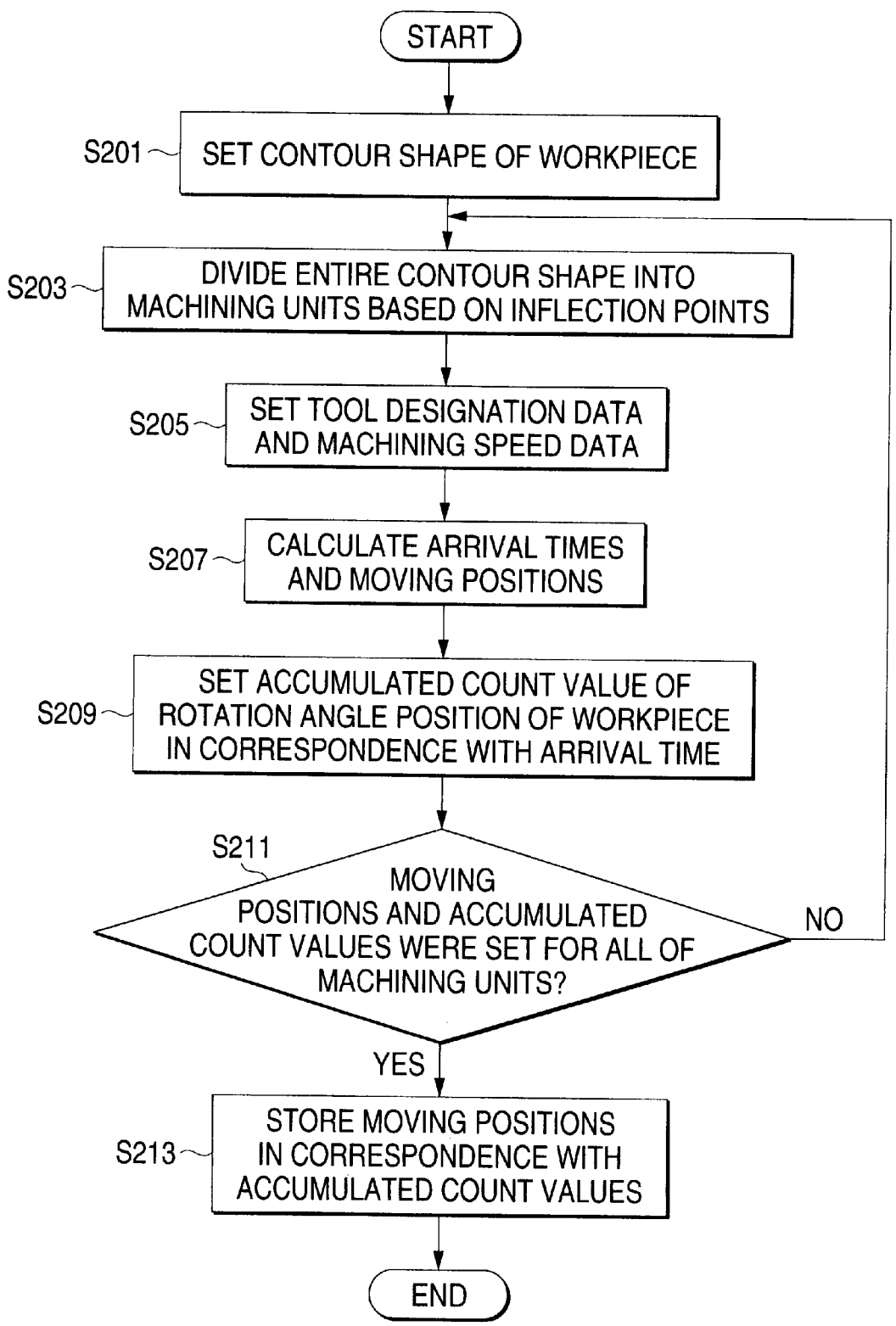
FIG. 21 is a flow chart for explaining a modified example of the moving position setting method of the machine tool according to the embodiment of the invention.

Succeedingly, a modified example of the method (the moving position setting method) for setting the position data table T shown in FIG. 3 will be explained based on FIG. 21.

First, like the aforesaid embodiment, the computer system sets the contour shape G at section along the rotation center axis L of the spindle rotation motor 11 (spindle) of the workpiece 2 based on CAD data representing the desired machining shape of the workpiece 2 (S201).

Next, the computer system divides the entirety of the contour shape G into machining units based on the inflection points contained in the contour shape G (S203: machining unit dividing process). In this case, the computer system automatically couples the two continuous inflection points thereby to collectively prepare the machining units and thereafter optimize them by dividing and coupling. Then, the computer system sets the machining order of the machining units thus optimized.

Succeedingly, the computer system sets at least the tool designation data and the machining speed data necessary for performing the machining of the first machining unit in accordance with the machining order of the machining units (S205: machining data setting process). When the tool designation data and the machining speed data is set, the computer system calculates an arrival time at each of the inflection points to be reached during machining along the sequence of the inflection points (machining time required for the machining unit). The calculation is based on the contour shape G or the CAD data (distances of the machining unit) and the machining speed data (cutting speeds for the machining unit). The computer system also calculates absolute values of the moving positions of the workpiece 2 and the tools corresponding to the respective inflection points (S207: calculation process).

Next, the computer system sets the rotation angle position of the workpiece as an accumulated value (accumulated count value) in correspondence to the arrival time for each of the machining units (S209: rotation angle position setting process). Then, the computer system determines whether the moving positions and the accumulated count values of the workpiece 2 and the tools were calculated for all of the machining units (S211). When the moving positions and the accumulated count values of the workpiece 2 and the tools have not been calculated for all of the machining units ("No" in S211), the procedure returns to S205 (the machining data setting process) and the steps from S205 to S209 are repeated. Thus, the rotation angle positions of the workpiece in correspondence to the arrival times are set as the accumulated values in accordance with the machining order of the machining units, respectively.

When the moving positions and the accumulated count values of the workpiece 2 and the tool are calculated and set for the last machining unit, the computer system stores the moving positions of the workpiece 2 and the tool calculated in S207 (the calculation process) in the position data storage portion 25 of the control unit portion 21 as the position data in correspondence to the rotation angle position (the accumulated count value) of the workpiece set in S209 (the rotation angle position setting process), in the form of the position data table T (S213: position data storage process).

As described above, according to the modified example, in the machining unit dividing process (S203), the contour shape G at section along the predetermined axis is automatically divided into the machining units, each comprising a plurality of the inflection points including the machining unit start point and the machining unit end point; in the machining data setting process (S205), at least the machining speed data necessary for performing the machining is set for each of the machining units; the calculation process (S207) calculates, based on the machining speed data set at the earlier process (S205), the arrival time at each of the inflection points to be reached during machining along the sequence of the inflection points. The moving positions (Zp), (Xp) of the workpiece 2 and the tool 3, 4 or 5 are also calculated in corresponding to each of the inflection points; and in the rotation angle position setting process (S209), the rotation angle positions of the workpiece 2 are set in correspondence to the corresponding arrival times as the accumulated count values (N) in accordance with the machining order of the machining units, respectively.

In this manner, the contour shape G is divided into the machining units based on the contour shape G of the finished workpiece 2, and the moving positions (Zp), (Xp) of the workpiece 2 and the tool 3, 4 or 5 are set for each of the machining units. Thus, the moving positions (Zp), (Xp) of the workpiece 2 and the tool 3, 4 or 5 thus set are suitable for the actual machining operation of the machine tool 1 for machining each of the machining units and so the position data etc. can be set easily without error. In particular, since the contour shape is divided into the machining units by the inflection points of the contour shape G, the moving positions can be inputted accurately by a small amount of the position data Further, since the moving positions (Zp), (Xp) of the workpiece 2 and the tool 3, 4 or 5 for each of the machining units are set for the accumulation value (N), the position data at the both ends of the machining unit does not change at the time of the calculation due to re-division, insertion, addition etc. of the machining unit. Any error to be accumulated by such calculation does not influence on the position data of other machining units. Further, at the time of the actual machining, since a moving command for controlling the movements of the workpiece 2 and the tools 3, 4, 5 is outputted based on the moving positions (position data) thus calculated, there does not occur a cumulative error to the dimensions of the machined workpiece 2. As a result, accurate machining by the machine tool 1 can be realized.

The invention is not limited to the aforesaid embodiment. For example, this embodiment is configured in a manner that the workpiece 2 and the tools 3, 4, 5 are made movable, and the moving positions of the workpiece 2 and the tools 3, 4, 5 are determined. However, the invention is not limited to such a configuration and may be arranged in a manner that only the workpiece 2 is made movable and the moving positions of the workpiece 2 can beset. Alternatively, the invention maybe arranged in a manner that only the tools 3, 4, 5 are made movable and the moving positions of the tools 3, 4, 5 can be set.

As described above in detail, the present invention provides a technology that can improve the machining accuracy of the workpiece without increasing a storage capacity for the position data.

What is claimed is:

1. A method for setting a moving position of at least one of a workpiece and a tool in a machine tool for machining the workpiece rotated around a predetermined axis into a desired shape by the tool, comprising:

dividing a contour shape of the desired shape at section along the predetermined axis into a plurality of machining units, each including a plurality of inflection points including a machining unit start point and a machining unit end point;

setting machining data including at least machining speed data for each of the machining units;

calculating an arrival time at each of the inflection points based on the machining speed data;

calculating a position of at least one of the workpiece and the tool at each of the inflection points; and setting a rotation angle position of the workpiece corresponding to the arrival time as an accumulated count value for each of the machining units.

2. The method according to claim 1 further comprising a step of adding a cutting stock to the machining unit to obtain a new machining start point and a new machining end point.

3. The method according to claim 2 further comprising a step of storing the position of at least one of the workpiece and the tool corresponding to the rotation angle position.

4. The method according to claim 1 further comprising a step of storing the position of at least one of the workpiece and the tool corresponding to the rotation angle position.

5. The method according to claim 1, wherein the step for setting the rotation angle position of the workpiece as an accumulated count value is performed for the machining units in the order of machining.

6. The method according to claim 5 further comprising a step of adding a cutting stock to the machining unit to obtain a new machining start point and a new machining end point.

7. The method according to claim 6 further comprising a step of storing the position of at least one of the workpiece and the tool corresponding to the rotation angle position.

8. The method according to claim 5 further comprising a step of storing the position of at least one of the workpiece and the tool corresponding to the rotation angle position.

9. A machine tool comprising:

a tool for machining a workpiece into a desired shape;

rotating means for rotating the workpiece around a predetermined axis;

moving means for moving at least one of the workpiece and the tool;

driving means for driving the rotating means and the moving means; and a computer system for controlling the driving means;

wherein the computer system
divides a contour shape of the desired shape at section along the predetermined axis into a plurality of machining units, each including a plurality of inflection points including a machining unit start point and a machining unit end point;

sets machining data including at least machining speed data for each of the machining units;

calculates an arrival time at each of the inflection points based on the machining speed data;

calculates a position of at least one of the workpiece and the tool at each of the inflection points;

sets a rotation angle position of the workpiece corresponding to the arrival time as an accumulated count value for each of the machining units; and thereby outputs a command to the driving means for controlling the movement of at least one of the workpiece and the tool according to the calculated position of at least one of the workpiece and the tool and the set accumulated count value.

* * * * *